Oct. 6, 1959 — L. D. GIBSON — 2,907,422
ACCELERATOR CONTROL DEVICE OF THE ELECTRIC TYPE
Filed April 28, 1958 — 4 Sheets-Sheet 1

Inventor.
Levi D. Gibson.
By Byron, Hume, Groen & Clement
Attys.

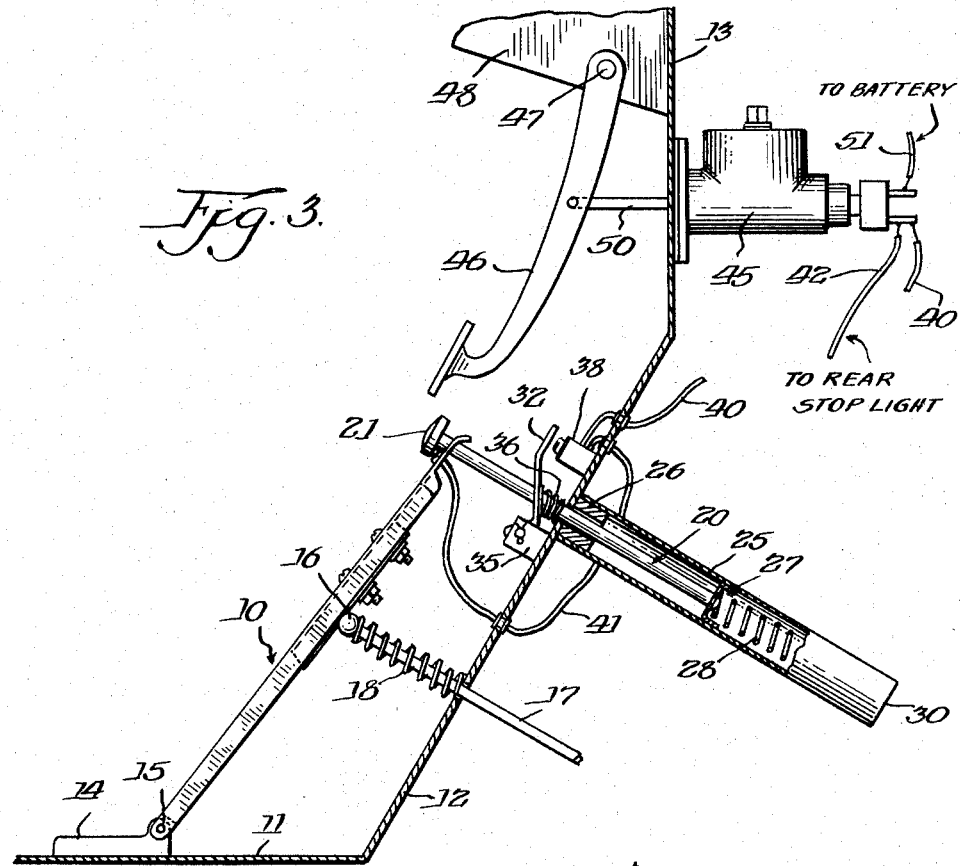
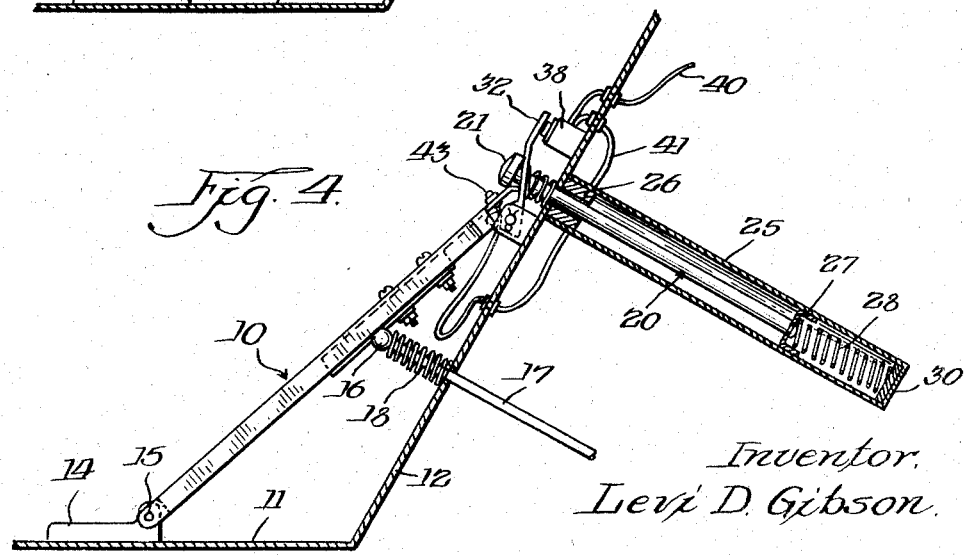

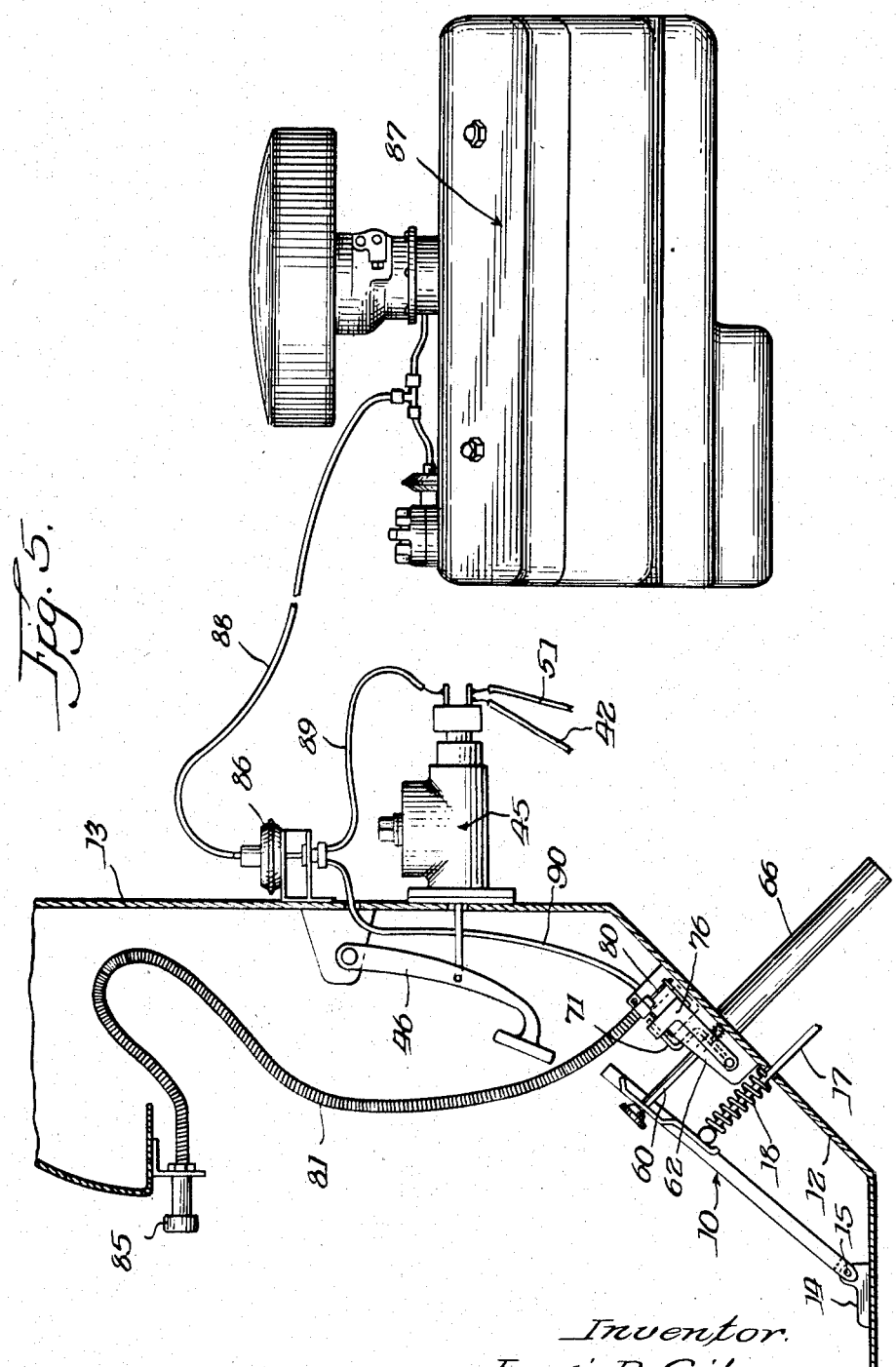

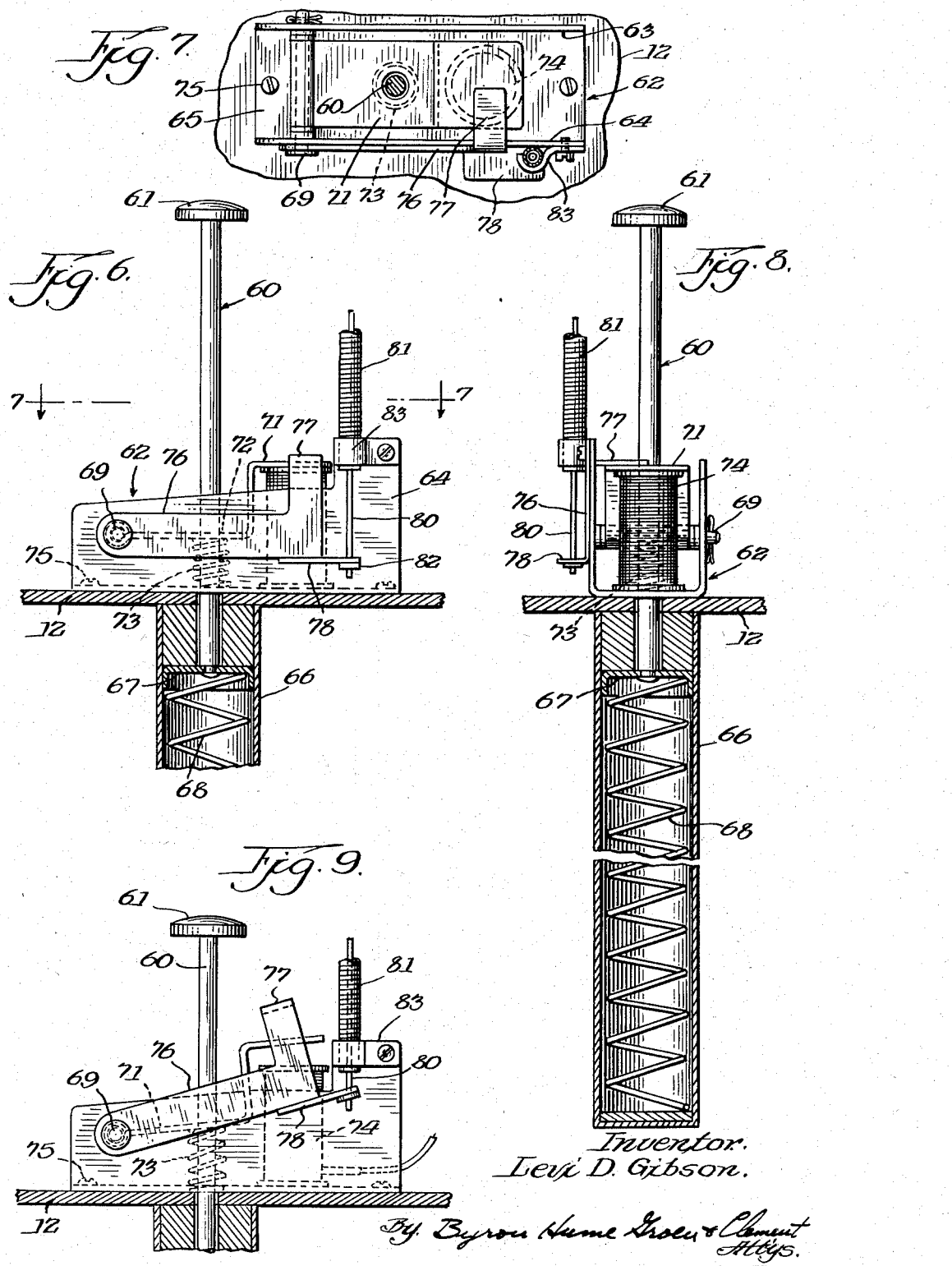

# United States Patent Office 2,907,422
Patented Oct. 6, 1959

2,907,422
ACCELERATOR CONTROL DEVICE OF THE ELECTRIC TYPE

Levi D. Gibson, Baxter Springs, Kans., assignor to Sekesco Company, Incorporated, Pittsburg, Kans., a corporation of Kansas Application April 28, 1958, Serial No. 731,205

5 Claims. (Cl. 192—3)

The invention relates to apparatus for controlling the cruising speed of automotive vehicles and has reference in particular to a combination accelerator lock and brake-actuated release whereby the operator is able to lock the accelerator pedal for a desired cruising speed and automatically release the same upon actuation of the brake pedal.

An object of the invention resides in the provision of apparatus that can be conveniently set at the selection of the driver for obtaining a desired cruising speed and which can be released by actuation of the brake pedal in applying the brakes.

Another object of the invention is to provide a new and improved accelerator lock with magnetic means for releasing the same and wherein said magnetic means is energized by actuation of the brake pedal in applying the brakes. The magnetic means in the form of a solenoid is electrically connected to the battery of the automobile through a terminal of the stop light and the circuit to the solenoid is closed through a grounded connection by actuation of the accelerator lock for any selected cruising speed. When the stop light is energized the solenoid is likewise energized and it thereupon functions to release the lock holding the accelerator pedal.

Another object is to provide apparatus as described which will incorporate the additional feature of permitting the driver to override the cruising speed at any time additional acceleration is required. Upon removing the foot from the accelerator pedal the same will return to the selected preset cruising speed. However, in the event the additional acceleration of the vehicle should be considered unsafe, the driver can momentarily apply the brakes and thereupon handle the vehicle in the usual manner.

A further object is to provide automotive accessory equipment in the form of an accelerator lock with brake release means adapted to be energized electrically and which will be simple in construction, embodying relatively few parts although effective and practical in operation.

With these and other objects in view, the invention may consist of certain novel features of construction and operation as will be more fully described and particularly pointed out in the specification, drawings and claims appended thereto.

In the drawings which illustrate an embodiment of the invention and wherein like reference characters are used to designate like parts—

Figure 3 is a sectional view showing the accelerator pedal in locked position at a selected cruising speed for the automobile;

Figure 4 is a sectional view illustrating an actuated position of the accelerator pedal for releasing the locking means in the event the electric power should fail;

Figure 5 is a view, parts being shown in vertical section, of a modification of the invention employing a vacuum operated switch for controlling current to the solenoid;

Figure 6 is a sectional view showing in detail the electric solenoid and associated structure as embodied in the modified form;

Figure 7 is a transverse sectional view taken substantially along line 7—7 of Figure 6;

Figure 8 is an end elevational view of the accelerator control device as shown in Figure 6; and Figure 9 is a view similar to Figure 6 but showing an operative position of the control device.

Figure 2:
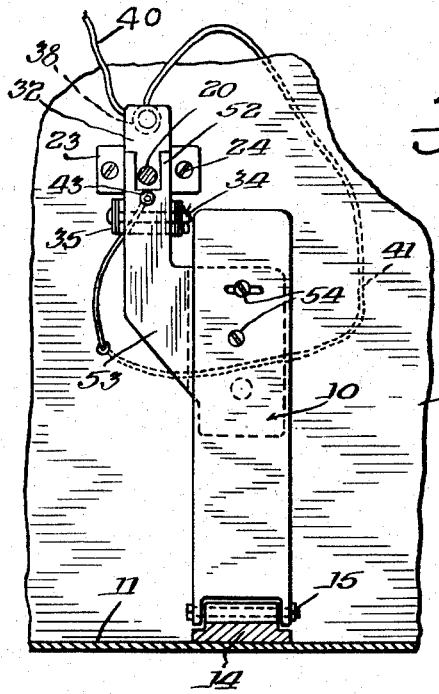
Figure 2 is a plan elevational view taken substantially along line 2—2 of Figure 1.

Referring to the drawings, the device of the invention is illustrated as applied to the accelerator pedal 10 of an automobile vehicle having conventional floor boards 11 and 12 and the upright dashboard 13. Floor board 11 has suitably secured thereto the support 14 for the accelerator pedal 10 and said pedal is pivotally secured to the support by the pin 15. The accelerator pedal 10 has contact with the ball end 16 of the accelerator rod 17, said rod extending through the floor board 12 to project above the board on the operator's side of the vehicle.

The coil spring 18 is carried by the accelerator rod 17, being located between the ball end 16 and the floor board 12. Accordingly, said coil spring is operative to yieldingly bias the accelerator rod into an elevated projected position and thus the accelerator pedal 10 is normally held in a raised position, which constitutes the idling position as regards the supply of gasoline to the motor of the vehicle. In the operation of the vehicle it will be understood that the operator by depressing the accelerator pedal 10 will depress the accelerator rod 17 to a corresponding extent and thus the engine of the vehicle is supplied with a greater quantity of gasoline so that its speed is increased. The operator can therefore control the speed of the vehicle by movement of the accelerator pedal 10 toward and from the floor board 12 of the vehicle.

Figure 1:
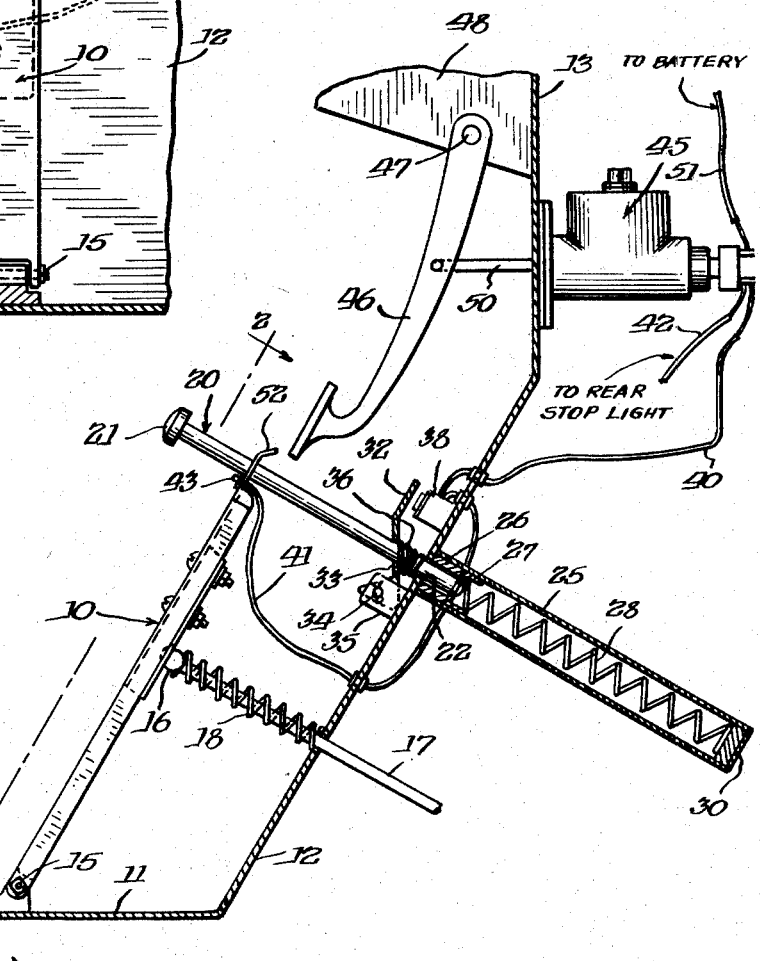
Figure 1 is a vertical sectional view taken through the floor board of an automobile and showing an installation of an accelerator lock and brake pedal release embodying the improvements of the invention.

In accordance with the invention the accelerator pedal lock with brake pedal release means is operatively associated with the accelerator pedal and this structure, as best shown in Figures 1 and 3, essentially consists of a control stem 20 having the button 21 fixed to its outer end and which is mounted by the floor board 12 of the vehicle for reciprocating movements toward and from said board approximately in a direction at right angles thereto.

For mounting the control stem 20 the floor board 12 is provided with an opening 22 and said opening is closed by plate 23 which may be secured to the floor board 12 by screws such as 24. The control stem 20 is actually mounted by said plate 23 in combination with the cylindrical container 25 fixed to the underside of the plate and which extends therefrom some distance below the floor board 12. Within the upper end of the cylindrical container 25 there is located the bearing washer 26. Said washer may be of rubber or other suitable material and the same is provided with an opening through which the control stem 20 extends. Since the washer 26 is confined within and supported by the cylindrical container 25, said washer in effect functions to mount control stem, permitting reciprocating movements of the stem in an outward direction.

The cap 27 is fixed to the lower end of the control stem 20, having location beyond the washer 26. The said cap has a dual function whereby it acts as a stop limiting upward movement of the control stem, and, secondly, the cap has contact with the coil spring 28, providing a seat for one end of the spring so that the spring is thus confined within the cylindrical container 25 between cap 27 and the bottom 30 of the said container.

The locking lever 32 is normally operative to lock the control stem in any selected depressed position of the stem. The said locking lever is provided with an opening 33 through which the control stem extends and said lever is preferably secured to the floor board 12 by means of the pivot pin 34 and the upwardly projecting ears 35. However, to render the locking lever operative for locking the control stem 20 in a depressed position it is necessary to resiliently bias the locking lever to maintain the same in an upward raised position. This is accomplished by coil spring 36 which has encircling relation with the control stem, being confined between the plate 23 and the locking lever 32. Thus the action of the coil spring 36 is to resiliently force the locking lever into a counterclockwise direction of rotation as viewed in Figures 1 and 3, and thus the lever is maintained by the spring in locking contact with the control stem 20.

The action of said locking lever 32 with respect to control stem 20 is such that the stem is free to be depressed at any time and which tends to move the locking lever downwardly against the resiliency of the coil spring 36. However, the lever will so engage the stem as to hold the same in any selected depressed position and in order to release the control stem it is necessary to depress the locking lever 32 and thus free the stem from its contact with the lever. For this purpose the invention provides magnetic means in the form of a solenoid 38 and which is fixedly secured to the floor board 12 of the automobile, being located below and directly under the locking lever 32. The solenoid 38 is electrically connected in series in a circuit formed by conductors 40, 41 and 42. The electric circuit additionally includes the terminal 43 carried by the accelerator pedal 10 and electrically connected to the conductor 41. It is required that terminal 43 be suitably insulated from the metal of the accelerator pedal and that the terminal have location in alignment with the button 21 of the control stem. Accordingly, when the stem is depressed for a set cruising speed, as shown in Figure 3, the button 21 of the control stem will be in contact with the terminal 43, thereby closing the electric circuit.

The master brake cylinder indicated in its entirety by numeral 45 is suitably supported from the upright dashboard 13 on the side toward the engine of the vehicle. The brake pedal 46 is pivoted at 47 to member 48 which locates the brake pedal on the side of the dashboard 13 toward the operator and the brake pedal 46 is operatively connected to the master brake cylinder by means of the piston rod 50. By actuation of the brake pedal in a counterclockwise direction, Figure 1, the brakes of the vehicle are applied by the hydraulic pressure developed in the master brake cylinder. Simultaneously with applying the brakes, a circuit is closed which energizes the rear stop lights of the vehicle so as to warn an approaching automobile as to a possible decrease in speed or eventual stopping of the vehicle. The conductor 51 has connection with the battery which supplies the direct current for energizing the rear stop lights. Conductor 42 has connection with the live terminal of the rear stop lights of the vehicle and conductor 40 is connected to the solenoid 38 and through conductor 41 said solenoid is connected to terminal 43.

When the control stem 20 is located in a depressed position it serves to hold the accelerator pedal in such position as illustrated in Figure 3. This is due primarily to the action of the button 21 with respect to the bifurcated end 52 of the connecting member 53, which functions to operatively connect the control stem with the accelerator pedal. The ears of the bifurcated end 52 have straddling relation with the control stem and it will be observed that said ears are located below the button 21. The opposite end of member 51 is adjustably fixed by screws 54 to the accelerator pedal 10 and it will be clearly seen that upon downward movement of the control stem 20 the button 21 will eventually contact member 53 and carry with it the accelerator pedal 10. Accordingly, whatever may be the locked depressed position of the control stem a similar depressed position will be assumed by the accelerator pedal.

Figure 3 illustrates a position of the parts when the control stem is operative for locking the accelerator pedal for a set cruising speed. The control stem 20 is locked in a depressed position by the locking lever 32 and through the button 21 the accelerator pedal is maintained in a selected depressed position corresponding to a certain cruising speed for the vehicle. It will also be observed that the button 21 is in contact with the terminal 43 and thus the circuit from the master brake cylinder, including conductor 40, solenoid 38, and conductor 41 is closed. This circuit is part of the ground connection, the same being grounded to the frame of the automobile and thereby having electrical connection to the negative terminal of the battery. As long as the brake pedal 46 remains in an inoperative position the parts will maintain their positions as shown in Figure 3. However, should the operator depress the brake pedal to apply the brakes even momentarily, the rear stop lights of the vehicle will be energized and by reason of the closed circuit for the solenoid 38 the said solenoid will likewise be energized. The solenoid will thereupon attract the locking lever 32, causing downward movement of the same to release the control stem 20. The spring 28 will immediately take over and force the control stem to its fully projected position and which thereupon releases the accelerator pedal 10 so that said pedal through the action of coil spring 18 is also moved to its fully projected position. The automobile is thus returned to an idling speed.

In the event the electric power of the vehicle should fail for some reason the locking lever 32 can be released by downward movement of the accelerator pedal 10 to its full extent. Such position of the parts is illustrated in Figure 4. For this purpose the bifurcated ears on the end 52 of the connecting member 53 are preferably bent downwardly for contact with the locking lever and in so doing the control stem 20 is immediately released.

The combination accelerator pedal lock with magnetic release, all as herein described, provides relatively simple apparatus for directly controlling the cruising speed of an automobile and which will permit the operator to select any desired cruising speed and maintain the same until it is necessary or desirable to again obtain conventional control of the automobile. This is effected by application of the brakes which energizes the rear stop lights of the vehicle and simultaneously energizes the solenoid 38 included in a series circuit with the stop lights through a grounded connection. By employing the said locking apparatus for the accelerator pedal the operator can assume a safer driving position during cruising speeds since he can rest his foot on the brake pedal and thereby eliminate the fraction of time required to shift his foot from the accelerator to the brake. The present apparatus has the further advantage that should the operator desire additional acceleration for passing another car, for example, it is possible to further depress the accelerator pedal for this desired additional acceleration and which will not disturb the locking lever 32 unless the accelerator is depressed to its full extent. Following this additional acceleration of the vehicle the operator can return to his cruising speed by merely lifting his foot from the accelerator pedal and allowing the accelerator to return to the depressed position as determined by the button 21 on the control stem.

In the modified form of accelerator control as shown in Figures 5 to 9 inclusive, the solenoid and locking lever are located within and supported by the channel member 62 having spaced upstanding side flanges 63 and 64 and a flat bottom piece 65. The control stem 60 passes through an opening in the bottom piece 65 and through the floor board 12 of the vehicle to extend into the cylindrical container 66. This end of the control stem has fixed thereto the cap 67 and said container houses the coil spring 68.

The pivot pin 69 journalled by the side flanges 63 and 64 pivotally supports the locking lever 71 having the opening 72 for receiving the control stem. The coil spring 73 yieldingly forces the locking lever into an operative position and the same is drawn downwardly into a release position by the solenoid 74 suitably fixed to the channel member which in turn is secured to the floor board 12 by the screws 75. The pivot pin 69 also mounts the safety lever 76 for independent movement and which is located adjacent flange 64 of the channel member. Said lever has two extensions, one of which, identified by numeral 77, extends over the top end of the solenoid. The other extension 78 projects from the bottom end of the lever and the wire 80 of the Bowdin wire control 81 is fixed thereto by the nut 82. The clip 83 is employed to secure the Bowdin wire control to the channel member. The opposite end of said control is affixed to the dash board of the vehicle for convenient access by the operator.

The control stem 60 is associated with the accelerator pedal 10 in the same manner as described and when the control stem is depressed and held down by the locking lever 71 it will be understood that the accelerator pedal is similarly controlled. The Bowdin wire connection with the safety lever 76 serves several purposes. When the knob 85 is pushed in toward the dash board the safety lever is located in down position where it contacts the locking lever 71 and holds the same inoperative against the solenoid 74. The accelerator control is thus rendered inoperable for city driving. There is no danger of accidentally pushing the control stem down and having it lock since as long as the safety lever is in the position of Figure 6 the apparatus can not operate. However, when driving on the highway, the knob 85 is pulled out to release the safety lever as shown in Figure 9 and the accelerator can then be set for the cruising speed desired. Accordingly, in this modified form of the invention there are two ways of releasing the accelerator control, one by the solenoid upon actuation of the brake pedal 46, and two, by the manual actuation of the knob 85. This latter provides a safety feature in case of electric power failure.

In Figure 5 the electric circuit for the solenoid 74 includes a vacuum operated switch 86 which opens the circuit when the motor 87 of the automobile is idling. The vacuum switch is connected to the same vacuum line that controls the spark advance in the ignition system. When the motor 87 is idling, there is no vacuum in the line 88 and the switch 86, being spring-loaded, is in "Off" position. When the motor is speeded up a vacuum is developed in the line and the switch is returned to "On" positon. The electric circuit is thereupon completed between the stop-light switch and the solenoid by means of the conductors 89 and 90.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a combination accelerator pedal lock with brake pedal release means as accessory equipment for automotive vehicles, of a control stem projecting from the floor board of the vehicle and mounted thereby for reciprocating movement approximately normal to the said floor board, resilient means for maintaining the control stem in projected position, a channel member, a locking lever for the control stem, a pivot pin supported by the channel member and mounting the locking lever for pivotal movement, other resilient means yieldingly urging the locking lever into operative position for automatically locking and holding the control stem in a depressed position against the expanding action of said resilient means, said accelerator pedal having a connected relation with the control stem whereby the accelerator pedal is also held in a depressed position when the control stem is locked in such a position, magnetic means in associated relation with the locking lever and operative to release the locking lever when the magnetic means is energized, means effecting energization of the magnetic means upon actuation of the brake pedal to apply the brakes, and a safety lever also pivotally supported by the channel member for holding the locking lever immovable in contact with the said magnetic means.

2. In a combination accelerator pedal lock with brake pedal release means as defined by claim 1, additionally including manually operable means for controlling the safety lever to locate the same in either a release position or in a position for holding the locking lever immovable.

3. In a combination accelerator pedal lock with brake pedal release means as accessory equipment for automotive vehicles, of a control stem projecting from the floor board of the vehicle and mounted thereby for reciprocating movement approximately normal to the said floor board, resilient means for maintaining the control stem in projected position, a channel member providing a base and upstanding side flanges, a locking lever for the control stem, a pivot pin supported by the side flanges and mounting the locking lever for pivotal movement, other resilient means yieldingly urging the locking lever into operative position for automatically locking and holding the control stem in a depressed position against the expanding action of said resilient means, said accelerator pedal having a connected relation with the control stem whereby the accelerator pedal is also held in a depressed position when the control stem is locked in such a position, magnetic means supported by the base of the channel member and operative to release the locking lever when the magnetic means is energized, means effecting energization of the magnetic means upon actuation of the brake pedal to apply the brakes, a safety lever also pivotally supported by the pivot pin for holding the locking lever immovable in contact with the said magnetic means, and a Bowdin wire control for controlling the operative and inoperative positions of the safety lever.

4. In a device of the character described, in combination with the brake pedal and accelerator pedal of an automotive vehicle, of a control stem projecting from the floor board of the vehicle and mounted thereby for movement in a direction approximately normal to said floor board, a coil spring for the control stem operative to maintain the control stem in projected position, a locking lever for the control stem, resilient means yieldingly urging the locking lever into operative position for automatically locking and holding the control stem in a depressed position against the expanding action of said coil spring, connecting means between the control stem and the accelerator pedal and having such relation with the parts that the accelerator pedal is also held in a depressed position when the control stem is locked in such a position, magnetic means in associated relation with the locking lever and operative to release the locking lever when the magnetic means is energized, conductors providing an electric circuit for the magnetic means, said electric circuit being normally open but being closed automatically when the control stem is depressed, means effecting energization of the magnetic means through said closed electric circuit upon actuation of the brake pedal to apply the brakes, said electric circuit for the magnetic means additionally including a terminal electrically connected to one of said conductors, said terminal being fixed to but insulated from the accelerator pedal, and said terminal being positioned on the accelerator pedal for contact by the control stem when the stem is depressed whereby the electric circuit is maintained closed during the time the stem is depressed.

5. In a combination pedal lock with brake pedal release means as accessory equipment for automotive vehicles of a control stem projecting from the floor board of the vehicle and mounted thereby for reciprocating movement approximately normal to the said floor board, resilient means for maintaining the control stem in projected position, a locking lever in associated relation with the control stem and operative to lock the stem in a depressed position against the resiliency of said resilient means, connecting means between the control stem and the accelerator pedal and having such relation with said parts that the accelerator pedal is also held in a depressed position when the control stem is locked in such a position, said connecting means and locking lever being so constructed and arranged as to permit additional depressed movement of the accelerator pedal in the event additional acceleration of the vehicle is required and which when released will assume its previous set position as determined by the control stem, a solenoid in associated relation with the locking lever and operative to release the locking lever when the solenoid is energized, conductors providing an electric circuit for the solenoid and which circuit is open except when the control stem is depressed, means effecting energization of the said solenoid through said closed electric circuit upon actuation of the brake pedal to apply the brakes, said electric circuit for the solenoid additionally including a terminal electrically connected to one of said conductors, said terminal being fixed to but insulated from the accelerator pedal, and said terminal being positioned on the accelerator pedal for contact by the control stem when the stem is depressed whereby the electric circuit is maintained closed during the time the stem is depressed.

References Cited in the file of this patent
UNITED STATES PATENTS

| | | |
|---|---|---|
| 2,624,433 | Godbout | Jan. 6, 1953 |
| 2,763,349 | Pokorny | Sept. 18, 1956 |
| 2,846,035 | Heath | Aug. 5, 1958 |